Patented Feb. 23, 1954

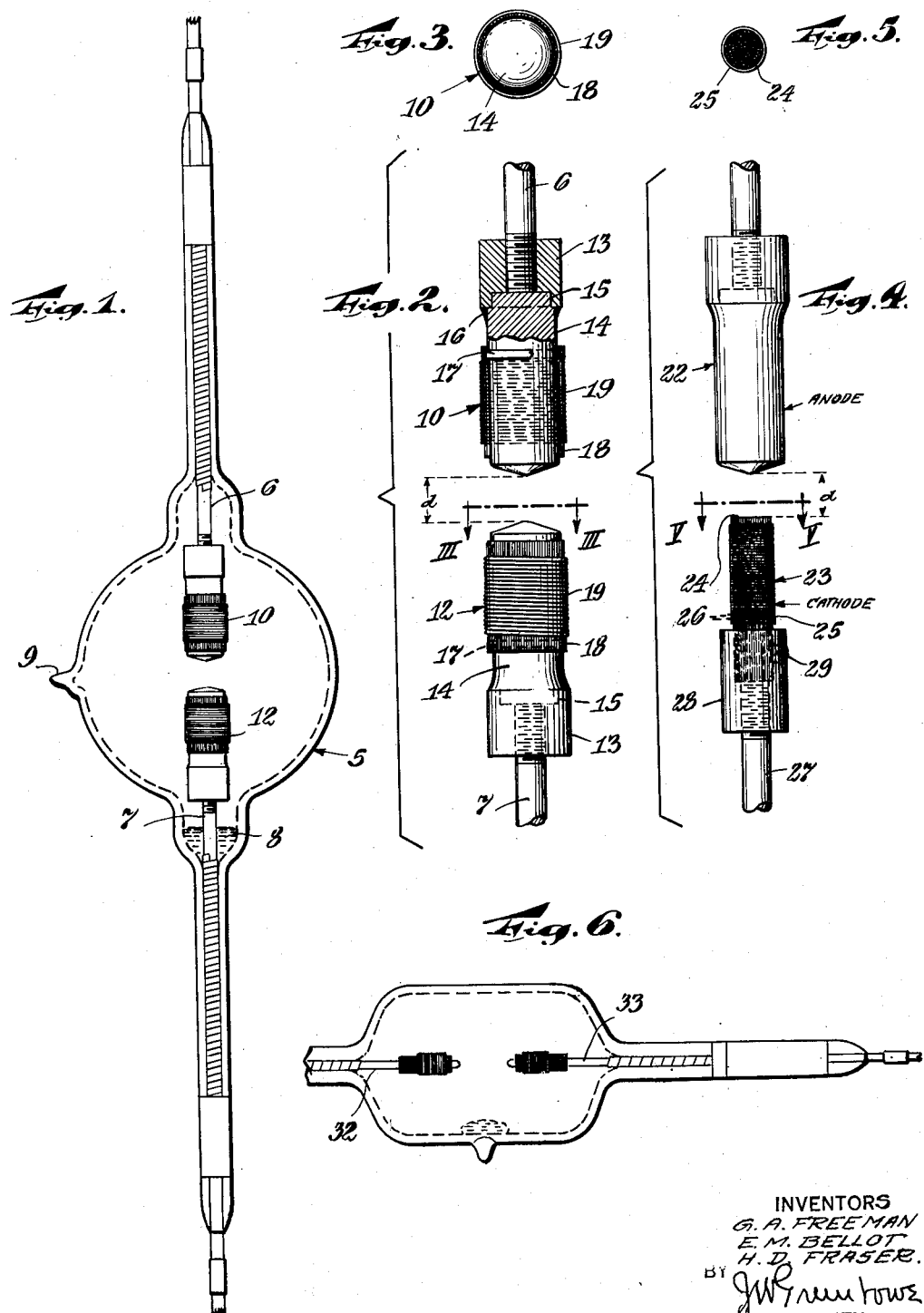

2,670,451

UNITED STATES PATENT OFFICE 2,670,451

SHORT ARC HIGH-PRESSURE VAPOR DISCHARGE LAMP

George A. Freeman, East Orange, Emile M. Bellott, Bloomfield, and Hugh D. Fraser, Verona, N. J., assignors to Westinghouse Electric Corporation, East Pittsburgh, Pa., a corporation of Pennsylvania Application January 12, 1950, Serial No. 138,132

1 Claim. (Cl. 313—184)

The present invention relates to electric discharge devices and particularly to high pressure vapor discharge lamps with short arc lengths and relatively high current and to the provision of electrodes therefor which produces a long useful lamp life.

Lamps of this type have long been known to the art, but their greatest disadvantage resides in the fact that they have a comparatively short useful life. Since such lamps operate at both high pressure and high temperature, the enclosing envelope is customarily formed of quartz or a vitreous material having a high silica content to withstand the necessary high operating temperature. Moreover, the arc discharge is concentrated, due to the high operating pressure, which thus confines the discharge to a small area approaching a point on the electrode surfaces. This likewise raises the electrodes to a high temperature and with repeated starting of the lamp, the electrodes disintegrate and sputter the metal particles on the interior envelope wall, causing blackening of the envelope and impairment of light output, thus destroying the useful life of the lamp after a comparatively short period of operation.

It is accordingly an object of the present invention to provide a high pressure vapor discharge lamp wherein a rugged electrode construction is employed which will not readily disintegrate during starting and operation of the lamp, thereby imparting a long useful life to the lamp.

Another object of the present invention is the provision of an electrode for a high pressure metallic vapor discharge lamp of substantially solid form and so designed as to cause a concentration of the arc discharge at a definite limited area of the electrode during operation of the lamp.

Another object of the present invention is the provision of an electrode for a high pressure metallic vapor discharge lamp having a solid core of highly refractory metal of high density and substantial purity at the arc-sustaining surface and surrounded by a bundle of fine wires to provide interstices for facilitating the initiation of a discharge when incorporated in a finished lamp.

Still further objects of the present invention will become obvious to those skilled in the art by reference to the accompanying drawing wherein:

Fig. 1 is a plan view of a completed high pressure metal vapor lamp for operating on alternating current and employing electrodes of the present invention with a wattage consumption of approximately 7½ kw. to 10 kw.;

Fig. 2 is an enlarged fragmentary view, partly in cross-section, of the oppositely disposed electrodes of the lamp shown in Fig. 1;

Fig. 3 is a plan view, taken on the line III—III of Fig. 2;

Fig. 4 is an enlarged fragmentary view, similar to Fig. 2, but showing the electrode construction for a lamp operable from a direct current source of supply;

Fig. 5 is a plan view, taken on the line V—V of Fig. 4; and

Fig. 6 is a fragmentary view of a high pressure metallic vapor lamp of somewhat lower wattage than the lamp as shown in Fig. 1 and illustrating a slight modification which the electrode construction of the present invention may take.

Referring now to the drawing in detail, the lamp shown in Fig. 1 comprises an envelope 5 of vitreous material, capable of withstanding a relatively high temperature such as quartz or a glass of high silica content. As will be noted, the envelope 5 has a central bulbous portion with elongated ends of receding diameter into which are sealed leading-in and electrode supporting conductors 6 and 7 in any suitable manner, but preferably as shown in Fig. 1 and more fully described and claimed in copending application Serial No. 109,902, filed August 12, 1949, and assigned to the same assignee as the present case. As is customary with lamps of this type, the envelope is filled with an ionizable medium comprising an inert gas, such as argon, neon or the like at a few millimeters' pressure, and a vaporizable metal, such as mercury 8, prior to sealing-off the envelope at the tip 9.

As can be seen from Figs. 1 and 2, the molybdenum leading-in and supporting conductors 6 and 7 carry oppositely disposed non-activated electrodes 10 and 12 which, for a lamp such as shown in Fig. 1, operating on alternating current and at a consumption of from 7½ kw. to 10 kw., are identical in construction. By reference more particularly to the cross-sectional view of Fig. 2, it will be noted that the leading-in and supporting conductor 6 is threaded at its inner end and thus threadedly engages a refractory metal collar 13 which preferably is formed of molybdenum. A heavy refractory metal core 14, formed of tungsten as hereinafter explained, has an annular portion 15 recessed in the collar 13 and the core and collar are rigidly united as by welding 16. Coiled about the tungsten core 14 adjacent the rear end thereof is a single turn of a metal 17 having a low work function, such as a strip of thorium of about .005 in. x .040 in., which emits electrons at low temperature, with this thorium turn being held in place by a plurality of longitudinally extending refractory metal wires 18, such as tungsten of about .005 in. diameter and 24 mm. long, and formed into a double layer about the periphery of the core 14. These latter layers 18 are in turn held in place by a coil 19 formed of about twenty turns of a tungsten wire of about .025 in. diameter, the ends of which are secured to the longitudinal wires 18 as by welding or the like.

Thus the longitudinal wires 18 protrude toward each end of the tungsten core 14 beyond the limit of the retaining coil 19 and form a plurality of crevices or interstices which facilitate the formation of cathode hot-spots for assisting in the initiation of the discharge. As shown, the electrode tips, which are the end of the tunsten core 14, are made slightly pointed by grinding to a cone-shape for the purpose of stabilizing the arc discharge at the center, thus preventing flicker due to wandering, and at the same time, providing the best heat conductivity away from the arc spot. Moreover, on A. C. operation for which the lamps of Figs. 1 and 6 are designed, this causes the cathode and anode spots to coincide on the electrode, with the result that apparently the cooling effect of electron emission, when the electrode is momentarily cathode, partly offsets the extreme heating effect of electron bombardment, when the electrode is momentarily anode, which appears to eliminate erosion of the electrode surface.

In the preparation of the electrode, undoped or commercially pure tungsten is employed for the heavy core 14. By this is meant that, while ordinary doped tungsten employed for filaments of incandescent lamps and electronic tubes contains potassium silicate and potassium chloride, no such doping material is present in the commercially pure tungsten from which the core 14 is formed, because such doping material would not stay inert at the operating temperature of the electrodes and being occluded would contaminate the lamp. The tungsten as actually employed in this instance is what is known as commercially pure tungsten which is devoid of the doping and contains only very small percentages of impurities. Following grinding of the cone-shaped tip, as above noted, and prior to sealing the electrodes into the lamp envelope, the ends thereof are melted in any suitable manner, such as by means of a D. C. arc discharge therebetween while the electrodes are disposed in an argon bottle. Such discharge purifies the tungsten at the tip and raises it to a sufficiently high temperature as to close the spaces or pores normally existing in large tungsten rod, so that theoretical grain density is obtained which provides higher heat conductivity and permits the electrodes to carry higher current without melting.

After melting of the core tip, the thorium strip 17, together with the wires 18 and coil 19, are placed about the periphery of the core 14 and the assembly then heated to about 1800° C. by high frequency induction heating, while the assembly is in a vacuum bottle, to further clean the electrode. This high temperature causes the thorium strip to melt slightly and run around the ends of the wires 18, thus serving to assist in holding the latter in place, while the thorium assists in the initiation of the discharge due to its low work function, as previously mentioned. The electrode assembly is then welded to the molybdenum collar 13 and screwed upon the one-quarter inch molybdenum leading-in rod ready for sealing into the envelope 5, as shown in Fig. 1.

As previously mentioned, the lamp of Fig. 1, together with the electrode construction of Figs. 2 and 3 are for an A. C. lamp of 7¼ to 10 kilowatt size. In Figs. 4 and 5, the electrode construction for a 7½ to 10 kilowatt D. C. lamp is therein shown, in which the anode 22 is identical to that previously described relative to the electrodes 10 and 12, except that this anode 22 need not be provided with the wires 18, coil 19, or strip 17. The cathode 23 on the other hand comprises a bundle 24 of about 5/16 in. in diameter and formed of tungsten wires of about .015 in. and 35 mm. in length. This bundle 24 is held together by a tungsten coil 25 of about .020 in. diameter and formed of approximately forty-five closely wound turns, and which also holds three or four pieces of thorium sheet 26 about .005 in. x .040 in. x .375 in. at the rear end of the coil. Again, as in the previously described construction, the one-quarter inch molybdenum leading-in and support wire 27 threadedly engages a molybdenum collar 28 which has a recess of about seven-sixteenths of an inch into which the bundle 24 projects and is held in place by a molybdenum set screw 29.

The lamp of Fig. 6 is an 800 watt A. C. lamp similar in most respects to the 7½ to 10 kilowatt lamp of Fig. 1 except for a slight modification in the electrode construction. In the modification of Fig. 6, the leading-in conductors 32 and 33 are of about .080 tungsten and provided with a pointed tip formed by arcing with D. C. in an argon bottle so as to melt the tip in the identical manner as previously described for the tungsten core 14 of Figs. 1 and 2. Since the leading-in conductors 32 and 33 in this instance also constitute the electrode core, they are surrounded adjacent their inner ends with the longitudinally extending tungsten wires and held in place, together with the thorium strip, by the tungsten coil in the same manner as previously described relative to Figs. 1 and 2.

High pressure short-arc discharge lamps as herein described have shown marked improvement in lamp life of many hours without deterioration in light output. Both the A. C. and D. C. 7½ to 10 kilowatt lamps have operated for periods of 50 to 100 hours before light output decreased to 75% of initial, due to envelope blackening, compared with 5 to 10 hours' life with such high pressure short-arc lamps of the prior art. Likewise 800 watt lamps of the type shown in Fig. 6 have operated for several hundred hours without excessive envelope blackening.

It thus becomes obvious to those skilled in the art that a high pressure short-arc vapor discharge lamp is herein provided wherein electrodes are employed which enables the passage of relatively high currents for a long useful life before deterioration of light output occurs due to envelope blackening. Moreover, the electrodes are so formed as to be of massive construction for rapid heat dissipation and due to their density, particularly at the surface where the arc discharge concentrates, erosion of the surface is confined to a minimum.

Although several embodiments of the present invention have been shown and described herein, it will be understood that still further modifications thereof may be made without departing from the spirit of the appended claim.

We claim:

A high pressure discharge device comprising a vitreous envelope, a pair of commercially pure tungsten leading-in and supporting conductors hermetically sealed to said envelope, an ionizable medium comprising an inert gas at a pressure of a few millimeters and a vaporizable metal in said envelope for initiating and sustaining a discharge and which attains a pressure greater than atmospheric during operation of said device, an electrode at the end of each of said leading-in conductors and between which an arc discharge occurs during operation of said device, each of said electrodes having an inner end tapered for concentrating the discharge at its tip and of high and pure grain density to facilitate the dissipation of the heat of the discharge from its end, and having a peripheral layer of longitudinally extending refractory metal wires carried by the end of said leading-in conductor adjacent its tip and held in place by a surrounding winding of refractory metal to provide a plurality of interstices for facilitating the formation of cathode hotspots to assist in initiation of the discharge, and said electrode including a strip of metal of low work function adapted to emit electrons at low temperature and initiate the discharge and to secure the peripheral layer of longitudinal wires in place.

GEORGE A. FREEMAN.
EMILE M. BELLOTT.
HUGH D. FRASER.

References Cited in the file of this patent

UNITED STATES PATENTS

| Number | Name | Date |
|---|---|---|
| 2,104,652 | Inman | Jan. 4, 1938 |
| 2,153,009 | Scott | Apr. 4, 1939 |
| 2,166,951 | Germer | July 25, 1939 |
| 2,171,234 | Freeman | Aug. 29, 1939 |
| 2,177,690 | Davies | Oct. 31, 1939 |
| 2,194,652 | Freedman | Mar. 26, 1940 |
| 2,217,438 | Francis | Oct. 8, 1940 |
| 2,251,046 | Gaidies | July 29, 1941 |

FOREIGN PATENTS

| Number | Country | Date |
|---|---|---|
| 121,679 | Australia | July 1, 1946 |
| 573,141 | Great Britain | Oct. 8, 1945 |